US009075956B2

(12) United States Patent
Dudley et al.

(10) Patent No.: US 9,075,956 B2
(45) Date of Patent: Jul. 7, 2015

(54) PROGRAMMABLE CUSTOMIZED USER INTERFACE FOR TRANSPORT REFRIGERATION UNITS

(75) Inventors: Kevin Dudley, Cazenovia, NY (US); Deborah Champagne, No. Syracuse, NY (US); John Hannon, Pennellville, NY (US); Daniel Waser, Liverpool, NY (US)

(73) Assignee: Carrier Corporation, Farmington, CT (US)

( * ) Notice: Subject to any disclaimer, the term of this patent is extended or adjusted under 35 U.S.C. 154(b) by 121 days.

(21) Appl. No.: 13/816,633

(22) PCT Filed: Aug. 4, 2011

(86) PCT No.: PCT/US2011/046617
§ 371 (c)(1),
(2), (4) Date: Feb. 12, 2013

(87) PCT Pub. No.: WO2012/021377
PCT Pub. Date: Feb. 16, 2012

(65) Prior Publication Data
US 2013/0145460 A1    Jun. 6, 2013

Related U.S. Application Data

(60) Provisional application No. 61/373,485, filed on Aug. 13, 2010.

(51) Int. Cl.
*G06F 17/30* (2006.01)
*G06F 21/00* (2013.01)
*F25D 29/00* (2006.01)

(52) U.S. Cl.
CPC .............. *G06F 21/00* (2013.01); *F25D 29/003* (2013.01); *F25D 2400/361* (2013.01)

(58) Field of Classification Search
USPC .......................................... 726/21
See application file for complete search history.

(56) References Cited

U.S. PATENT DOCUMENTS 5,181,389 A    1/1993    Hanson et al.
6,111,504 A *  8/2000    Packard et al. ............ 340/568.1
(Continued)

FOREIGN PATENT DOCUMENTS

CN    1882894 A    12/2006
CN    201429177 Y    3/2010
(Continued)

OTHER PUBLICATIONS

International Search Report and Written Opinion for related International Application No. PCT/US11/46617; report dated Apr. 12, 2012.
(Continued)

*Primary Examiner* — Amare F Tabor
(74) *Attorney, Agent, or Firm* — Miller, Mathias & Hull LLP

(57) ABSTRACT

A control device having a graphical user interface for controlling the operation of a transport refrigeration unit is disclosed. The graphical user interface may include a menu structure having multiple levels of menu options, executable functions and data items that may be navigated and viewed by a user. Access to the various menus may be user-specific and controlled so that a subset of the information in the menu structure is available to normal users, and larger subsets of the information are available to advanced users having higher levels of authorization to the menus and information contained in the graphical user interface device. The graphical user interface may also include programmable soft keys that may take users directly to frequently viewed menu options, functions and data items without the necessity of navigating through the levels of the menu structure.

27 Claims, 7 Drawing Sheets

(56) References Cited

U.S. PATENT DOCUMENTS

| | | | |
|---|---|---|---|
| 6,502,411 B2* | 1/2003 | Okamoto | 62/129 |
| 6,595,430 B1 | 7/2003 | Shah | |
| 6,862,499 B1* | 3/2005 | Cretella et al. | 700/299 |
| 6,994,620 B2 | 2/2006 | Mills | |
| 7,433,890 B2* | 10/2008 | Bair et al. | 1/1 |
| 7,558,564 B2* | 7/2009 | Wesby | 455/419 |
| 7,661,071 B2 | 2/2010 | Blanco | |
| 8,756,122 B2* | 6/2014 | Lowenstein | 705/28 |
| 2006/0146773 A1* | 7/2006 | An et al. | 370/338 |
| 2006/0151529 A1 | 7/2006 | Crisp, III | |
| 2007/0195079 A1 | 8/2007 | Boudewyns et al. | |
| 2007/0289731 A1 | 12/2007 | Deligiannis et al. | |
| 2008/0013860 A1 | 1/2008 | Blanco | |
| 2008/0036742 A1 | 2/2008 | Garmon | |
| 2008/0289354 A1 | 11/2008 | Dudley et al. | |
| 2009/0099697 A1 | 4/2009 | Li et al. | |
| 2009/0228155 A1 | 9/2009 | Slifkin et al. | |
| 2009/0248218 A1* | 10/2009 | Dyrmose | 700/300 |

FOREIGN PATENT DOCUMENTS

| | | |
|---|---|---|
| EP | 2105688 A1 | 9/2009 |
| EP | 2105688 A2 | 9/2009 |

OTHER PUBLICATIONS

Chinese Office Action, Application No. 201180039315.1 dated on Sep. 17, 2014.

* cited by examiner

FIG. 9

UNIT DATA

Engine
Refrigeration
Remote Sensors
Refrigeration System

BACK    EXIT

FIG. 10

ENGINE

| Fuel Level | 4.85gal. |
| Battery Voltage | 13.4 VDC |
| Charging Amps | 6.5 Amps |
| Coolant Temp | 78°F (26°C) |

BACK    EXIT

FIG. 11

UNIT DATA

Engine
Refrigeration
Remote Sensors
Date Recorder Sensors
Refrigeration System

BACK    EXIT

FIG. 12

ENGINE

| Fuel Level | 4.85gal. |
| Battery Voltage | 13.4 VDC |
| Charging Amps | 6.5 Amps |
| Coolant Temp | 78°F (26°C) |
| Engine Oil Pressure | 48 PSIG |

BACK    EXIT

PROGRAMMABLE CUSTOMIZED USER INTERFACE FOR TRANSPORT REFRIGERATION UNITS

CROSS-REFERENCE TO RELATED APPLICATIONS

This application is a 35 U.S.C §371 U.S. national stage filing of International Patent Application No. PCT/US11/46617 filed on Aug. 4, 2011 claiming priority under the Paris Convention and 35 U.S.C. §119(e) to U.S. Provisional Patent Application Ser. No. 61/373,485 filed on Aug. 13, 2010.

FIELD OF THE DISCLOSURE

The present disclosure generally relates to transport refrigeration units and, in particular, relates to a graphical user interface providing control of the amount of information and menus available to different types of users.

BACKGROUND OF THE DISCLOSURE

Goods such as perishable food items that must be kept within certain temperature ranges during transfer between locations are transported in vehicles such as trucks, trailers, rail cars, or refrigerated containers provided with a refrigeration system that interfaces with the cargo space to maintain the cargo at a predetermined temperature. The refrigeration system may include a transport refrigeration unit capable of producing cold or warm air and transferring the air into the cargo space. In basic implementations, the transport refrigeration unit may be controlled by a thermostat that monitors the temperature of the cargo space and alternately turns the unit on and off to maintain a preset temperature. In modern implementations, however, more sophisticated control devices and graphical user interfaces are integrated into the transport refrigeration unit and may be capable of providing more intelligent control of the unit. These control devices may monitor operating parameters of the refrigeration unit and the cargo area of the vehicle, and then control the unit based on the collected data to efficiently maintain the specified temperature of the cargo area and adjust for changes in the operating conditions affecting the temperature within the cargo space.

The control device or main module is typically mounted on the refrigeration unit, and may include a graphical user interface having a display screen and input devices, such as buttons, that allow a user to view information stored at the control device, to change settings for the refrigeration unit, and to navigate through a system of menus to get to the desired information and to cause functions to be executed by the control device to control the operation of the refrigeration unit. Currently, a visual output device, such as dot matrix or similar type of display, may display the available menus to a user, but menus are typically difficult to traverse and manage, and take time to navigate to the desired function or data. Consequently, it is desirable to provide a control device having input devices and displays allowing a user to quickly and intuitively navigate menus and display desired data and control functionality.

Another issue with control devices for the transport refrigeration units in current use is the general availability of the entire menu system to virtually anyone that can operate the inputs of the control device. With many current control devices, any person could walk up to the refrigeration unit when the vehicle is parked at a truck stop, press the buttons on the control device, and view information contained therein and possibly alter settings of the graphical user interface. Certain information available at the control device is important for the driver of the vehicle to know the current conditions within the cargo space and whether the refrigeration unit is operating properly. However, the owners of the vehicles may wish to limit the amount of information and menus available to drivers, and the amount of data to which the drivers have access, either for security reasons or because such information is wholly irrelevant to the driver's task of transporting the shipment to its destination. Therefore, a further need exists to lock the driver out of certain menus while allowing other authorized users of the control device to freely navigate the menus to which they are granted access.

SUMMARY OF THE DISCLOSURE

In accordance with one aspect of the disclosure, a graphical user interface device for controlling and monitoring the operation of a transport refrigeration unit may include a display device, a plurality of input devices, a data storage device, an input port for operatively connecting an external device to the graphical user interface device, and a processor operatively connected to the display device, the plurality of input devices, the memory device and the input port. The processor may be programmed to store a menu structure in the data storage device of the graphical user interface device, wherein the menu structure may include multiple levels of menu options, and wherein each menu option may have an option security level designation stored therewith. The processor may further be programmed to cause the display device to display a first subset of the menu options when no authorization code is input by a user at the graphical user interface device, wherein the menu options in the first subset may have option security level designations equal to a first security level designation, and the processor may be programmed to cause the display device to display a second subset of the menu options in response to entry of an authorization code by a user at the graphical user interface device, wherein the menu options in the second subset may include the menu options in the first subset and menu options having option security level designations equal to a second security level designation.

In accordance with another aspect of the disclosure, a method for providing access for display of a menu structure of a graphical user interface device for a transport refrigeration unit may include storing the menu structure in a data storage device of the graphical user interface device, wherein the menu structure may include multiple levels of menu options, and wherein each menu option may have an option security level designation stored therewith. The method may further include displaying a first subset of the menu options at a display device of the graphical user interface device when no authorization code is input by a user at the graphical user interface device, wherein the menu options in the first subset may have security level designations equal to a first security level designation, and displaying a second subset of the menu options at the display device of the graphical user interface device in response to entry of an authorization code by a user at the graphical user interface device, wherein the menu options in the second subset may include the menu options in the first subset and menu options having menu security level designations equal to a second security level designation.

In accordance with a further aspect of the disclosure, an apparatus for regulating the temperature of an insulated trailer for transporting perishable goods may include a transport refrigeration unit capable of producing warm or cold air and directing the warm or cold air into a cargo space of the insulated trailer, and a graphical user interface device operatively connected to the transport refrigeration unit to display information regarding the operation of the transport refrigeration unit and allow users to make input selections for controlling the operation of the transport refrigeration unit. The graphical user interface device may include a display device, a plurality of input devices, a memory device, an input port for operatively connecting an external device to the graphical user interface device, and a processor operatively connected to the display device, the plurality of input devices, the memory device and the input port. The processor may be programmed to store a menu structure in the data storage device of the graphical user interface device, wherein the menu structure may include multiple levels of menu options, and wherein each menu option may have an option security level designation stored therewith. The processor may further be programmed to cause the display device to display a first subset of the menu options when no authorization code is input by a user at the graphical user interface device, wherein the menu options in the first subset may have security level designations equal to a first security level designation, and the processor may be programmed to cause the display device to display a second subset of the menu options in response to entry of an authorization code by a user at the graphical user interface device, wherein the menu options in the second subset may include the menu options in the first subset and menu options having menu security level designations equal to a second security level designation.

Other advantages and features will be apparent from the following detailed description when read in conjunction with the attached drawings.

BRIEF DESCRIPTION OF THE DRAWINGS

For a more complete understanding of the disclosed system and method, reference should be made to the embodiments illustrated in greater detail in the accompanying drawings, wherein:

FIG. 9 is a front view of a unit data sub-menu for a normal user of the graphical user interface of the transport refrigeration unit of FIG. 1;

FIG. 10 is a front view of an engine sub-system screen for a normal user of the graphical user interface of the transport refrigeration unit of FIG. 1;

FIG. 11 is a front view of the unit data sub-menu for an advanced user of the graphical user interface of the transport refrigeration unit of FIG. 1;

FIG. 12 is a front view of the engine sub-system screen for an advanced user of the graphical user interface of the transport refrigeration unit of FIG. 1;

It should be understood that the drawings are not necessarily to scale and that the disclosed embodiments are sometimes illustrated diagrammatically and in partial views. In certain instances, details which are not necessary for an understanding of the disclosed methods and systems or which render other details difficult to perceive may have been omitted. It should be understood, of course, that this disclosure is not limited to the particular embodiments illustrated herein.

DETAILED DESCRIPTION OF THE DISCLOSURE

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
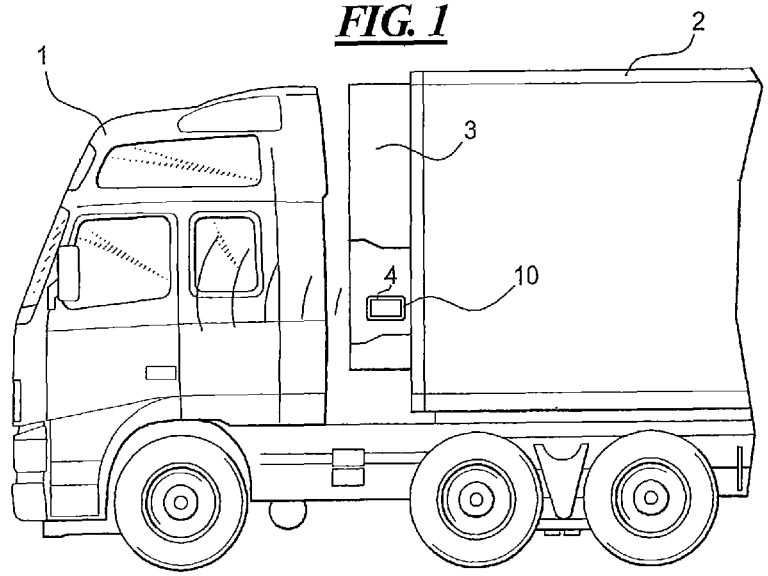
FIG. 1 is a pictorial view of a portion of a tractor-trailer having a transport refrigeration unit with a graphical user interface in accordance with the present disclosure.

FIG. 1 illustrates an implementation of a graphical user interface for a transport refrigeration unit in accordance with the present disclosure in a semi-trailer truck having a tractor 1 hauling an insulated trailer 2 on which a transport refrigeration unit 3 is mounted to provide conditioned air to the interior cargo space of the trailer 2. The operation of the transport refrigeration unit 3 may be controlled by a control device or main control module 4 having a graphical user interface device 10 having a display screen and input devices as will be discussed further below. The control module 4 may be operatively coupled to the trailer 2, either directly or via the transport refrigeration unit 3 to receive information regarding the current status of relevant aspects of the trailer 2 and the surrounding environment that may be used in the control of the transport refrigeration unit 3. For example, the control module 4 may receive data from temperature and moisture sensors within the trailer 2 as well as external to the trailer 2 for use in the control strategy for maintaining the temperature within the trailer 2, as well as from a sensor that may indicate whether the trailer door is open or closed. Similarly, the control module may be operatively coupled to the transport refrigeration unit 3 to monitor various operating parameters of the components and sub-systems of the refrigeration unit 3, such as the engine, compressor and fan, and to provide control signals to the components of the refrigeration unit 3 for operation of the refrigeration unit 3 in accordance with a selected control strategy. As indicated by the transmission waves in FIG. 1, the control module 4 may further be configured with wireless communications capabilities to communicate with equipment within the tractor 1, such as an on-board computer, PDA, cellular telephone or the like, or with remote equipment that may be located at a main office of the owner. Of course, those skilled in the art will understand that the control module 4 may be provided with communications capabilities for direct connect with an external device, such as the will be discussed below, and such wireless and direct connections are contemplated by the inventors as having use in user interfaces in accordance with the present disclosure.

Figure 2:
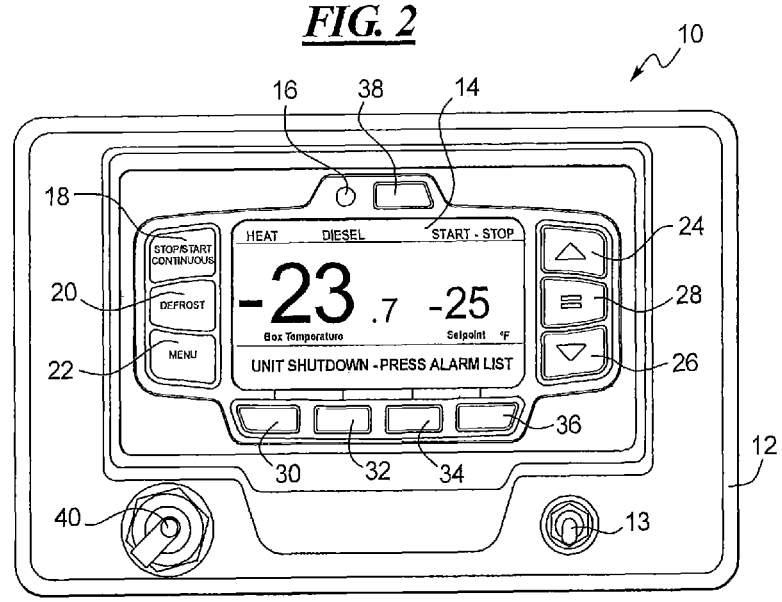
FIG. 2 is a front view of an embodiment of the graphical user interface of the transport refrigeration unit of FIG. 1.

Turning to FIG. 2, one embodiment of a user interface 10 is shown. The components of the user interface 10 may be installed within a housing 12 that may be mounted to the transport refrigeration unit 3 and that is sufficiently durable to withstand exposure to the elements and impacts as the semi-tractor trailer transports cargo between destinations. An on/off switch 13 may control the power to the user interface 10 as well as the entire transport refrigeration unit 3, and may be any appropriate switch, such as the illustrated toggle switch. The user interface 10 may include a central display screen 14 sized to clearly display information thereon, and may provide graphics large enough to be seen from a distance, such as from inside the cab of the tractor 1. The display screen 14 may be any appropriate type of display device, such as dot matrix display or LCD screen, to provide sufficient resolution for the users when displaying information thereon. The user interface 10 may include a further visual output device in the form of an alarm lamp 16 that may be illuminated to notify the driver or other user of the user interface 10 when alarm conditions are present in the transport refrigeration unit 3 and/or the trailer 2. If necessary, the user interface 10 may be capable of producing an audible output of alarm signals, instructions and the like from a speaker (not shown) disposed within the housing 12.

The user interface 10 is provided with various inputs for controlling the operation of the transport refrigeration unit 3 and the display of information on the display screen 14. An engine mode button 18 allows a user to select a mode of operation of the transport refrigeration unit 3. In the "Start/Stop" mode, the user interface 10 will control the engine of the refrigeration unit to start and stop as necessary to maintain the cargo space or box of the trailer 2 within a specified temperature control band. In the "Continuous" mode, the user interface 10 will keep the engine running continuously to provide continuous airflow and more constant temperatures. The user interface 10 may be configured to toggle between the "Start/Stop" and "Continuous" modes each time a user presses the engine mode button 18. Additional direct control of the operation of the refrigeration unit 3 may be provided by a defrost button 20. Pressing the defrost button 20 may cause the user interface 10 to signal the control module 4 to defrost the evaporator coil in the refrigeration unit 3. Such manual defrosting of the evaporator coil may be necessary before the trailer 2 is loaded, or when the refrigeration unit 3 is experiencing other conditions causing the coil to ice up. Once manual defrosting is actuated by pressing the defrost button 20, the user interface 10 may be configured to continue defrosting until the defrost button 20 is pressed again and the user interface 10 sends a signal to discontinue defrosting, for a predetermined period of time after which the manual defrosting mode is discontinued, and/or until the control module 4 determines that the coil is defrosted.

A menu button 22 is provided to allow a user to enter the menu hierarchy when the button 22 is depressed. When the menu button 22 is pressed, the display on the display screen 14 may be updated to the display a main menu listing the top level menu options available to the user. In one embodiment, the menu options may be listed in a vertical column on the display screen 14, with one of the menu options being highlighted to indicate that the menu option is the active option. In such a listing, a scroll up button 24 and scroll down button 26 may be pressed to sequentially highlight the menu options upwardly or downwardly, respectively. When a desired one of the menu options is highlighted, a save/select button 28 may be pressed to select the highlighted menu option and cause the user interface 10 to update the display screen 14 with a further display corresponding to the selected menu option, such as a display of a lower level menu or a display of parameter values indicative of the operating conditions or performance of the transport refrigeration unit 3.

In an alternative embodiment discussed more fully below, menu options may be provided in a horizontal list at a lower portion of the display screen above soft keys 30-36. The functionality of the soft keys 30-36 will be discussed more fully below, but in the menu display, one of the soft keys 30-36 may be pressed to cause the user interface 10 to execute the corresponding menu option in a similar manner as pressing the save/select button 28 as discussed above. Where the menu includes more menu options than the number of soft keys 30-36, a user may be able to scroll through the additional menu options by pressing the menu button 22 multiple times to sequentially display the menu options. Alternatively, the additional menu options may be displayed by pressing the scroll buttons 24, 26 as discussed above. For example, where the user interface 10 is provided with four soft keys 30-36, pressing the scroll down button 26 may cause the four listed menu options to be replaced by the next four menu options, and pressing the scroll up button 24 may cause the four listed menu options to be replaced by the previous four menu options.

While the buttons 24-36 have just been described with respect to their menu functions, the buttons may perform different functions for the user interface 10 when the device 10 is not displaying a menu listing at the display screen 14. For example, the scroll buttons 24, 26 may be used to increase and decrease the value of a parameter being set by a user. The display at the display screen 14 in FIG. 2 may be the display associated with the function of setting the set point for the box temperature in the trailer 2. For this function, pressing the scroll up button 24 may increase the set point temperature by increments of 1° F., and pressing the scroll down button 26 may decrease the set point temperature by increments of 1° F. Once the desired set point temperature is displayed, the user may press the save/select button 28 to save the new set point value and cause the user interface 10 to transmit the new set point value to the control module 4 to control the temperature accordingly. The soft keys 30-36 may also perform different functions depending on the menu being displayed or the function being performed as will be discussed more fully below.

As previously discussed, the alarm lamp 16 may be illuminated when alarm conditions are present in the transport refrigeration unit 3 and/or the trailer 2. As an alternative to immediately displaying alarm messages on the display screen 14, an alarm list button 38 may be provided to allow a user to display the alarm message(s) at the appropriate time after being prompted by the alarm lamp 16. After the alarm list button 38 is pressed and the alarm message(s) is/are displayed, the user may be able to navigate through the alarm message(s) and associated functionality using the buttons 24-36 is a similar manner as discussed above.

In addition to the input and output devices of the user interface 10 discussed in the immediately preceding paragraphs, the user interface 10 may also be capable of two-way communications with external devices. As mentioned above, the user interface 10 may be configured for performing wireless communications, such as with devices within the cab of the tractor or with other remote locations. The user interface 10 may further be configured with ports providing the capability of direct connection to external devices. Consequently, the user interface 10 may be provided with a Universal Serial Bus (USB) port 40 to which an external device may be connected via an appropriate cable. External devices such as USB flash drives, personal computers, cellular telephones, smart phones, PDAs and the like may be connected to the user interface 10 via the USB port 40.

Once connected, the user interface 10, control module 4 and the external device may be able to exchange software, data and other information necessary for controlling and monitoring the operation of the transport refrigeration unit 3 in regulating the temperature within the trailer 2. For example, the external device may download updated versions of the system software of the control module 4 or user interface 10, or new or revised set points or control schedules for the operation of the control module 4. The external device may also provide software for performing diagnostics routines for determining the operational status of the control module 4 and refrigeration unit 3, and correcting detected issues. Conversely, the user interface 10 and/or control module 4 may download historical data regarding the operation of the control module 4 and the refrigeration unit 3 to the external device that may be used to analyze the performance of the control module 4 and unit 3. Additional external connections and corresponding external device to which the user interface 10 and/or control module 4 may be connected will be apparent to those skilled in the art and are contemplated by the inventors as having use with user interfaces 10 in accordance with the present disclosure.

Figure 3:
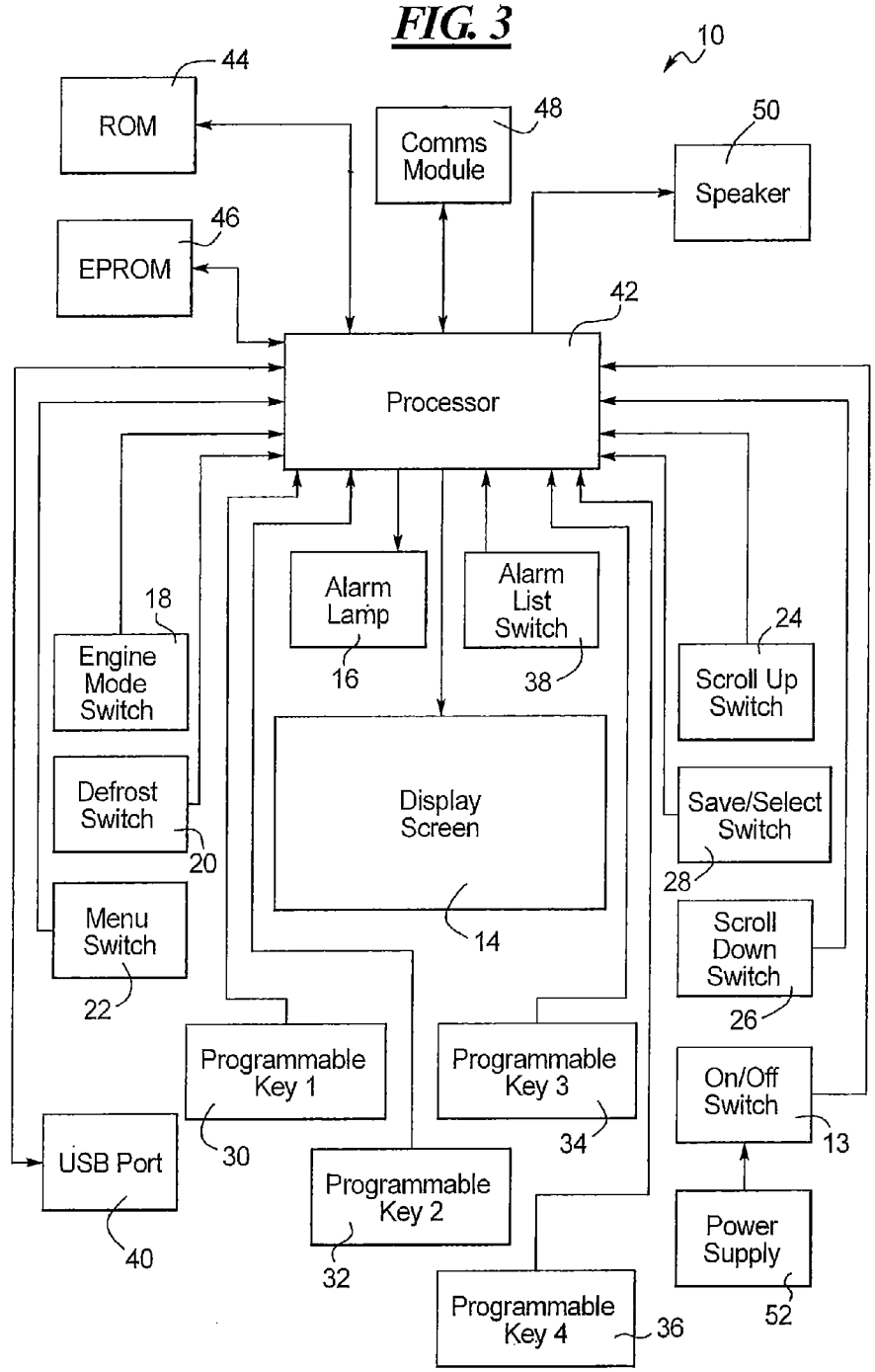
FIG. 3 is a block diagram of the electrical components of the graphical user interface of the transport refrigeration unit of FIG. 1.

FIG. 3 provides a block diagram of a configuration of electrical components that may be provided in the user interface 10. For purposes of avoiding confusion and unnecessary redundancy in the present disclosure, the switches corresponding to the buttons 18-38 will be identified by the same reference numerals as used in FIG. 2. Those skilled in the art will understand that for each mechanical portion of the input devices described above, a corresponding electrical component operatively connected thereto creates a detectable input signal causing the user interface 10 to do something. Consequently, the buttons 18-22 on the left side of the display screen 14 have corresponding switches 18-22, the buttons 24-28 on the right side of the display screen 14 have corresponding switches 24-28, and so forth.

In addition to the components discussed above, the user interface 10 may include a processor 42, read only memory (ROM) 44, erasable programmable read only memory (EPROM) 46 and a communications module 48, with all the components being interconnected to perform the processing described herein. The processor 42 may be any appropriate processing device capable of executing program instructions stored in ROM 44 and EPROM 46, read data from and write data to EPROM 46, detect actuation of the switches 18-38, output signals causing the display screen 14, alarm lamp 16 and a speaker 50 to operate, and to communicate with external devices connected to the user interface 10 at USB port 40 or other connectivity ports provided in the user interface 10. Power for the user interface 10 may be provided by a power supply 52 operatively connected to the processor 42 via the on/off switch 13 when the switch 13 is in the "on" position. ROM 44 and EPROM 46 may be any appropriate permanent and erasable non-volatile memories, respectively, capable of storing the software necessary to provide the functionality of the user interface 10 discussed herein. The communications module 48 may encompass the hardware and software necessary for performing communications with the control module 4 and with additional external devices. Consequently, the communications module 48 may be configured with a direct connection to the control module 4, and for performing wireless communications with external devices such as those discussed above. Moreover, the communications module 48 may include additional external interface ports in addition to the USB port 40 to which external devices may be directly connected to the user interface 10 for the exchange of information. Those skilled in the art will understand that the combination of electrical components illustrated and described herein is merely exemplary, and other combinations of electrical components capable of providing the functionality set forth herein are contemplated by the inventors as having use in user interfaces 10 in accordance with the present disclosure. Additionally, though portions of the disclosure discuss the operation of the user interface 10 with reference to the actuation of the buttons 18-38, the outputting of information at the output devices 14, 16, 50, and the exchange of information with a device connected at the USB port 40, it should be understood that the underlying execution of the functionality is performed by the internal electrical components in a manner that is understood by those skilled in the art.

Figure 4:
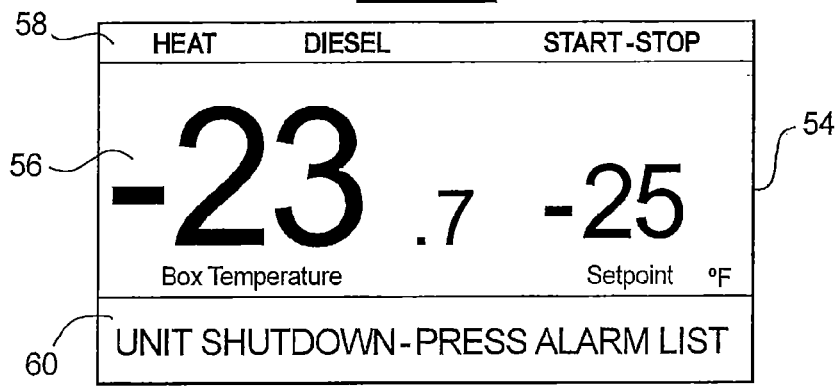
FIG. 4 is a front view of a main display screen of the graphical user interface of the transport refrigeration unit of FIG. 1.
Figure 5:
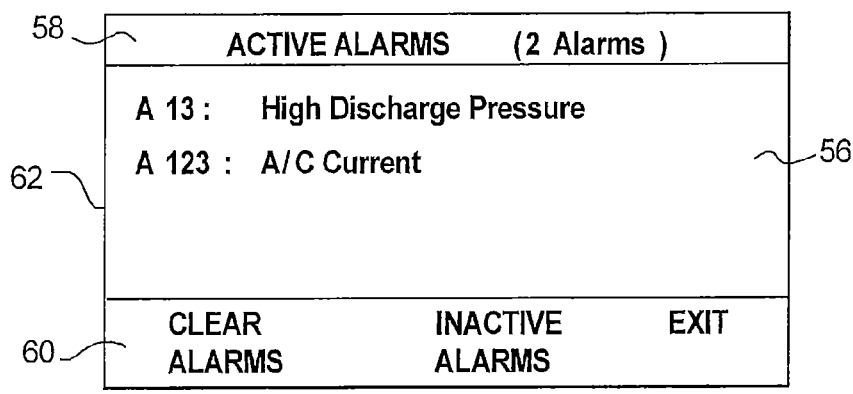
FIG. 5 is a front view of an active alarm screen of the graphical user interface of the transport refrigeration unit of FIG. 1.
Figure 6:
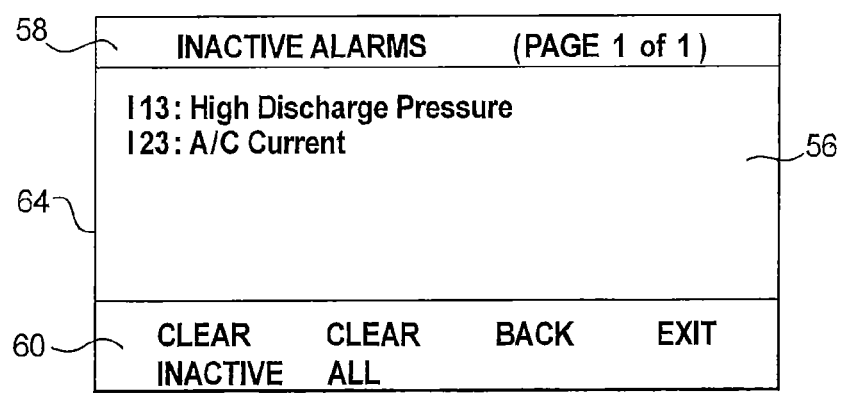
FIG. 6 is a front view of an inactive alarm screen of the graphical user interface of the transport refrigeration unit of FIG. 1.

FIG. 4 illustrates a main display screen 54 that may be output at the display screen 14 of the user interface 10 when the control module 4 is functioning normally to control the refrigeration unit 3. Each screen display may include a main display area 56, an upper status indication strip 58 and a lower advanced communications strip 60. The advanced communications strip 60 may provide information to the user necessary for the performing functions on the user interface 10. For example, the strip 60 displays an indication that the unit 3 has shut down and that the alarm list button 38 should be pressed. The message may be accompanied by the illumination of the alarm lamp 16. When the alarm list button 38 is pressed, an active alarm screen 62 (FIG. 5) may be displayed at the display screen 14 listing all the active alarms. If necessary, the user may use the scroll buttons 24, 26 to scroll through the list of active alarms. The advanced communications strip 60 may display actions that may be taken in response to the alarms, with each action being positioned above a corresponding one of the soft keys 30-36. Consequently, pressing the soft key 30 may clear the active alarms and move them to an inactive alarms list, pressing the soft key 34 may cause an inactive alarm screen 64 (FIG. 6) to be displayed, and pressing the soft key 36 may cause the main display screen 54 to again be displayed, possibly without the alarm message in the advanced communications strip 60.

As discussed above, the user interface 10 may have a series of menus and sub-menus allowing a user to navigate to the functions and data available to the user. In previously known user interfaces, all users of the user interface had access to the all the menu and sub-menu options. In the present user interface 10, access to menus and data may be restricted based on the level of authorization granted to a group of users or a particular user. In one embodiment, a menu structure may be stored in the ROM 44 and/or EPROM 46 of the user interface 10 having a top level of menu options, one or more lower levels of options, and ultimately the functions that can be executed and parameters that may be displayed at the lowest levels. Each menu option, function and parameter may have an associated security level stored therewith that may control whether a given user having a prescribed authorization may have the menu option, function or parameter displayed. For example, options, functions and data that may be generally available to all users regardless of their authorization may have a security level designation of "N" for normal users, and options, functions and data available only to users with greater levels of authorization may have a security level designations of "A" for advanced users and "T" for technicians. Though three levels are described herein, the user interface 10 may be capable of providing multiple levels of increasing security corresponding to increasing levels of authorization that may be desired by the owner of the system. Moreover, two or more security level designations may provide a similar amount of security within the system, but with each providing information and menu options that are meaningful to the user's job. Consequently, there may be overlap in the menus to which two levels are authorized, but with each level having access to certain information and/or menus to which the other level does not have access.

The menu structure and security level designations for the menu options, functions and parameters may be input to the user interface 10 and stored in the memories 44, 46 using any appropriate data input or downloading methods or combination of methods. For example, a basic, permanent menu structure may be hard coded into the user interface 10 and stored in ROM 44 when the user interface 10 is manufactured and/or initially configured with the system software. At the same time, portions of the menu structure that may later be modified may be written to EPROM 46. Alternatively, the entire initial menu structure may be written the EPROM 46. After the initial configuration, updates to the menu structure and security level designations may be downloaded to the user interface 10, along with other software updates, from external devices via the USB port 40 and/or communications module 48.

Figure 15:
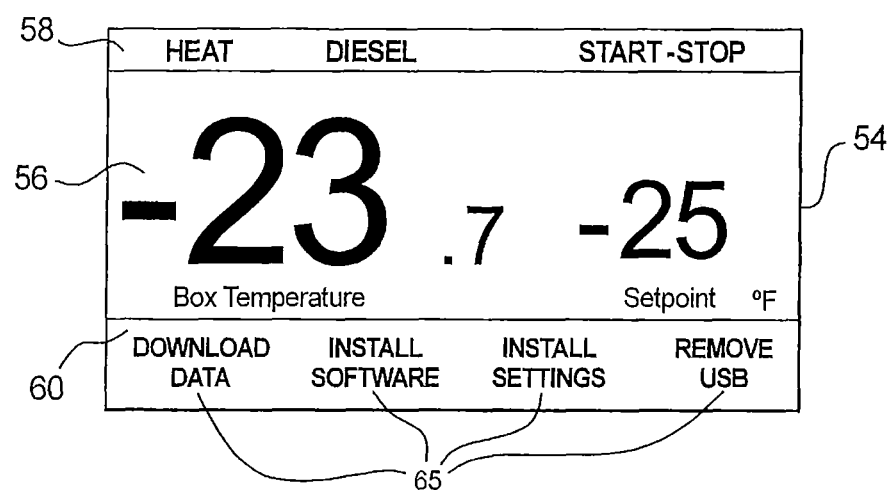
FIG. 15 is a front view of a main display screen of the graphical user interface of the transport refrigeration unit of FIG. 1 with a USB main menu displayed in the advanced communication strip.

The updates may be loaded onto a USB flash drive, for example, that is then delivered to the refrigeration unit 3 and connected to the user interface 10 via the USB port 40. Once connected, the updates may be loaded automatically or through upload functions that may be executed using the buttons 18-36 of the user interface 10. For example, the user interface 10 may cause a list of USB menu options 65 to be displayed in the advanced communication strip 60 when the USB device is connected as shown in FIG. 15. The menu items may include options for downloading data, installing software, installing settings, such as IntelliSet settings for products, and removing the USB device. When "Download Data" is selected, the display at the advanced communication strip 60 may be changed to indicate that data is being copied along with a graphical or numeric indication of the progress of the download, and then provide an indication that the download is complete. When "Install Software" is selected, a series of additional screens may be displayed showing the software versions on the user interface 10 and the USB device along with instructions for initiating the installation, the progress of the software installation, and an indication of the completion of the installation. When "Install Settings" is selected, a series of additional screens may be displayed showing the settings available for downloading, the progress of the installation of the selected settings, and an indication of the completion of the installation. Alternatively, the updates may be downloaded to the user interface 10 from local or remote external devices via the communications module 48 using direct connections or wireless communications depending on the particular configurations of the communications module 48. As a further alternative, the user interface 10 may be configured for manual updating of the menu structure and security level designations by authorized users using the input devices at the user interface 10.

The configuration of the user interface 10 may also set the mechanism by which users having higher levels of authorization may gain access to the menu options, functions and data having correspondingly higher security level designations. In one embodiment, authorization codes at an authorization level or at a user level may be stored at the user interface 10, and access to the appropriate menu options, functions and data may be granted when an authorized user inputs the correct authorization code at the user interface 10. Entry of the authorization code may entail pressing buttons 18-36 in a specific sequence that matches the authorization code stored in the user interface 10. The sequence may include pressing multiple buttons 18-36 simultaneously. In one example, the soft keys 30-36 may represent the numbers 1-4, respectively, and the authorization code may be a multiple digit number. Consequently, the authorization code "1234" may require the user to press soft keys 30-36 in order from left to right. Larger numbers such as "5," "6" and "7" may require the user to press two of the soft keys 30-36 simultaneously, such that the authorization code "5137" may be entered by pressing the soft keys 30 and 36 or 32 and 34 simultaneously, followed by soft key 30, soft key 34 and soft keys 34 and 36 simultaneously. The processor 42 may detect the sequence and compare the authorization code represented by the sequence to the stored authorization code. If a match is found, the processor 42 may update an authorization level for access to the information of the user interface 10 to match the authorization code such that the appropriate menu options, functions and data are displayed. The level of authorization may remain in effect until a logout function is executed, or a predetermined period of time elapses and the user is logged out automatically.

In an alternative embodiment, the authorization code may be stored on a USB flash drive or other device in possession of the user and that may be connected to the user interface 10. At the time the device is connected to the user interface 10, the processor 42 may read the authorization code stored on the device and compare it to the authorization code(s) stored in the memories 44, 46. If a match is found, the appropriate level of access may be granted to the user in a similar manner as discussed above. These methods of entry for the authorization codes are exemplary and other entry methods for entering such data will be apparent to those skilled in the art.

Figure 7:
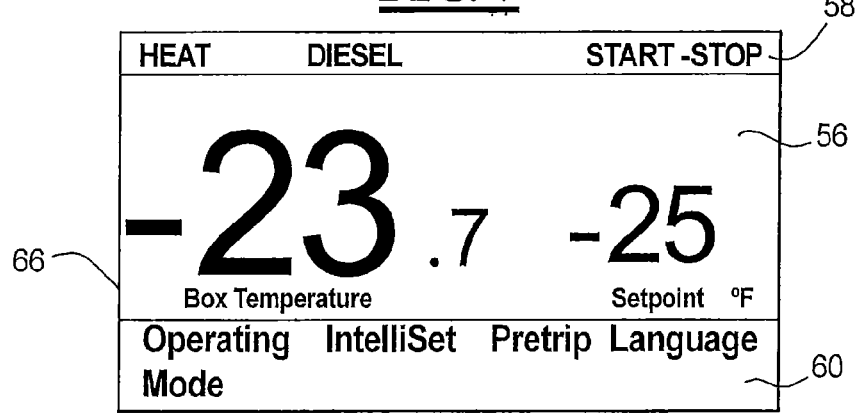
FIG. 7 is a front view of a main display screen of the graphical user interface of the transport refrigeration unit of FIG. 1 with a first set of top level menu options.

When the user interface 10 is configured and operational, a normal authorization level may provide all users with access to the default menu options, functions and data having the minimum security level designation, such as "N" for normal users. At the normal authorization level, the processor 42 may select the subset of menu options, functions and data having the minimum security level designation for display to and use by the user. When the user presses the menu button 22, the top level menu options may be displayed for the user in the advanced communications strip 60 of a main menu screen 66 as shown in FIG. 7. The top level menu options for a transport refrigeration unit 3 may include "Operating Mode," which may lead to a sub-menu providing a plurality of options for the operation of the refrigeration unit, "IntelliSet," which may lead to a sub-menu listing products for which refrigeration settings are pre-programmed into the user interface 10 and/or the control module 4, "Pretrip," which may lead to a sub-menu with options to execute a pretrip refrigeration routine or view the results of a previously-executed pretrip routine, and "Language," leading to a list of language options from which the user may select and that will be applied to all messages, including programmable messages.

Figure 8:
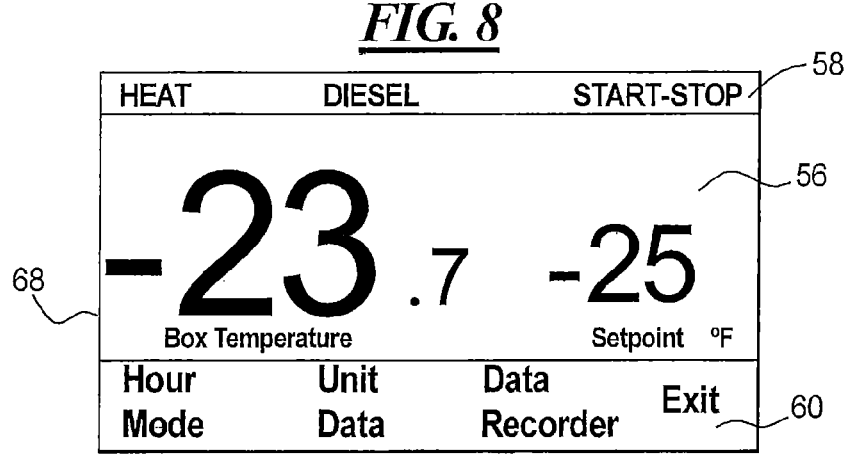
FIG. 8 is a front view of the main display screen of FIG. 7 with a second set of top level menu options.

Additional top level menu options may be provided on a second main menu screen 68 shown in FIG. 8. The user may navigate to the screen 68 by pressing the scroll down button 26, or by pressing the menu button 22 a second time. The advanced communications strip 60 may be updated by the processor 42 to list additional top level menu options such as "Hour Meter," which may lead to a list of parameters for which the hours of operation or hours of remaining availability may be viewed, "Unit Data," which may lead to a sub-menu listing sub-systems of the refrigeration unit 3 for which values of operating parameters are recorded and may be viewed, "Data Recorder," that may lead to a sub-menu with options for graphically displaying or printing recorded data, and "Exit," which may return to the main display screen 54 of FIG. 4. The present example assumes that all the top level menu options of the main menu screens 66, 68 are available to all users regardless of their level of authorization. However, one or more of the menu options may have a higher security level designation, in which case the menu options would be blanked out and not be displayed until an appropriate authorization code is entered by a user.

For the normal users, the subset of menu options, functions and data available to them will be displayed at the display screen 14 as they drill down into the menu structure by making selections using the scroll buttons 24, 26, the save/select button 28 and the soft keys 30-36. Consequently, when the second main menu screen 68 is displayed, the user may press the soft key 32 to navigate to a unit data sub-menu screen 70 having a list of sub-systems of the refrigeration unit 3 that are monitored by the control module 4 and for which data is available to be viewed at the user interface 10. In this example, the minimum security level users may be able to view data for the engine, refrigeration, remote sensors and the refrigeration system. Other sub-systems may exist in the refrigeration unit 3, but not all are available to the normal user.

The user may use the scroll buttons 24, 26 to move up and down the list, and then press the save/select button 28 to select the desired sub-system. When the "Engine" sub-system is selected, an engine sub-system screen 72 may be displayed showing the parameters of the engine sub-system for which the normal user has access, along with the current measure value of each parameter that is stored at the control module 4 and/or the user interface 10. Consequently, the fuel level, battery voltage, charging amps and coolant temperature are displayed. After viewing the engine parameters, the user may go back to the previous unit data sub-menu screen 70 by pressing the soft key 34, or may exit out of the menu structure and back to the main display screen 54 by pressing the soft key 36.

The display and access for the normal users may now be contrasted with the display and access provided to the users with higher levels of authorization. At some point during use of the user interface 10, the advanced user or technician enters an authorization code using the buttons 18-38 of the user interface 10, a connected external device such as a USB flash drive, or other suitable mechanism for delivering the authorization code to the processor 42. Once the authorization code is confirmed and the user enters the menu structure, the processor 42 selects a broader subset of the available menu options, functions and data to which the advanced user or technician is permitted access. The additional information will be displayed to the advanced user or technician in addition to the information that was displayed to the normal user. As a result, the unit data sub-menu screen 70 of FIG. 9 is updated in FIG. 11 to include an option to the advanced user or technician for viewing data recorder sensor data. If selected, a data recorder sensor data screen (not shown) that was wholly unavailable to the normal user will be displayed to the advanced user or technician. Similarly, when the advanced user selects the engine sub-system for viewing, the engine sub-system screen 72 of FIG. 10 is displayed as shown in FIG. 12 including a value for the engine oil pressure. Similar differences between the menu options, functions and data displayed for the normal user and the advanced user or technician will be present throughout the menu structure. In addition, any of the functions may be locked out from any type of user. For example, the engine mode button 18 may be locked out for normal users to prevent them from changing between the stop/start and continuous modes. On the other hand, the button 18 may be active for advanced users and technicians.

Other levels of authorization may be established based on the level of access required for a user or group of users that may provide more or less information than is provided for the advanced user. Depending on the needs of the respective users, the subset of the total information to which a particular level of authorization has access may entirely encompass the subset of information available to the lower level users, and may be entirely encompassed by the subset of information available to the higher level users. Conversely, the respective subsets of information for the various authorization levels may overlap without the higher level subsets completely encompassing the lower level subsets.

Figure 13:
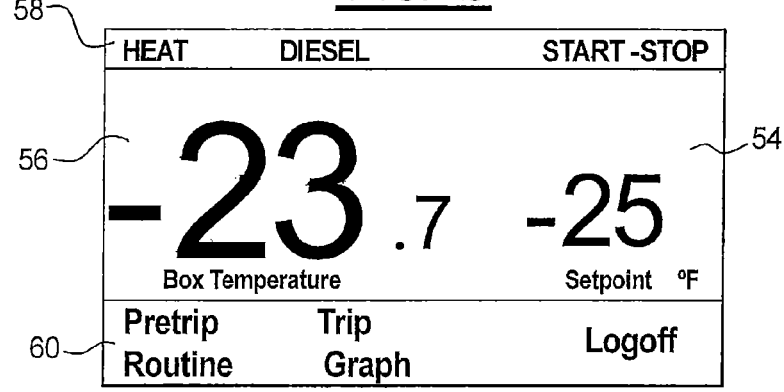
FIG. 13 is a front view of the main display screen of FIG. 4 with labels for pre-programmed soft keys.

In addition to customizing the menu options, functions and data that may be accessed based on the authorization level of the user, the user interface 10 may be customized for a user to provide shortcuts to frequently used menus, functions and/or data. The customization may be performed by programming the processor 42 and memories 44, 46 to interpret actuation of the soft keys 30-36 for all users, or by authorization code entered by the user. The customer may be able to program the keys 30-36 via PC software and program control to provide efficient navigation to important functions and information. For example, it may be desirable to allow the driver of the tractor-trailer 1 to quickly view the fuel level for the unit 3 without spending time navigating several menus and sub-menus to find the unit data screen that displays the fuel level. When a technician logs into the user interface 10 to evaluate the recent performance of the refrigeration unit 3, it may be desirable, for example, to allow the technician to quickly initiate a pretrip routine if the trailer is being prepared to haul a load of perishable goods, or to retrieve information regarding the ability of the control module 4 and unit 3 to maintain the temperature within the cargo space at or near the set point temperature during a previous trip. To facilitate recovery and display of the information, the soft keys 30-36 and the main display screen 54 may be customized for the technician as shown in FIG. 13. The user interface 10 may be programmed so that actuation of the soft key 30 causes the control module 4 to begin executing a pretrip routine of the refrigeration unit 3.

Figure 14:
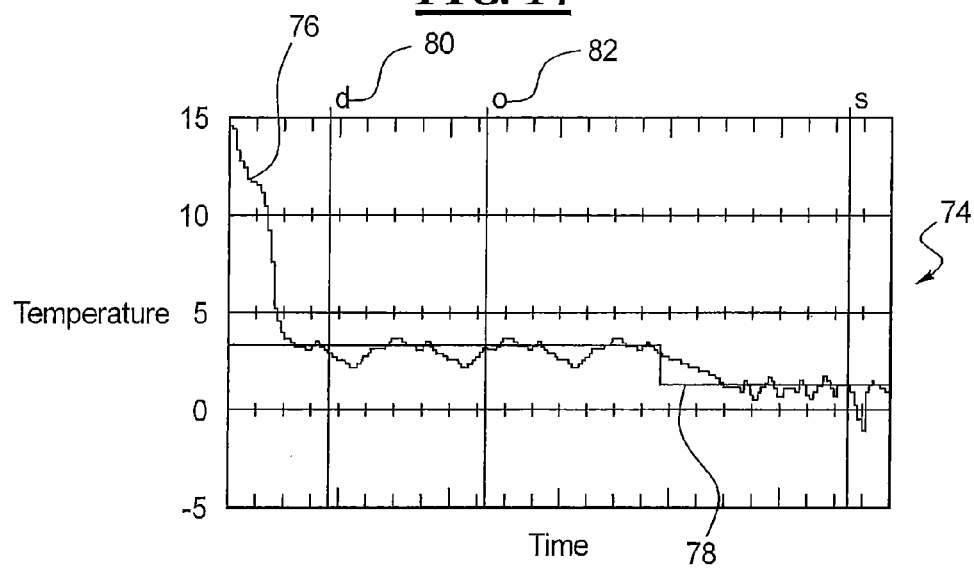
FIG. 14 is a front view of a trip graph display screen of the graphical user interface of the transport refrigeration unit of FIG. 1.

The user interface 10 may also be programmed to display a trip graph 74, such as that shown in FIG. 14, when the soft key 32 is pressed. During a trip, the control module 4 monitors the performance of the refrigeration unit 3 and may store data related to the performance at a memory associated with the control module 4 and/or at the EPROM 46 of the user interface 10. The performance data may include the set point temperature and the actual temperature within the cargo area of the trailer at discrete time periods during the trip, information for events, such as opening of the door and defrosting of the refrigeration unit, occurring during the trip including the time of the events and their duration, and the like. This information may be displayed at the user interface in the form of the trip graph 74 during or after the trip to assist in evaluating the performance of the refrigeration trip at the trailer 2 without the necessity of downloading the information to another device, perhaps at a location remote from the trailer 2.

The trip graph 74 may have a vertical axis representing the temperature within the cargo space, and a horizontal time axis. The trip graph 74 may plot the actual temperature 76 over time, and include a reference line 78 representing the set point temperature during the trip. To further assist the technician in evaluating the performance of the unit 3, the trip graph 74 may indicate events during the trip that may have affected the temperature within the cargo space, such as defrosting the evaporator coil 80 and opening the trailer door 82. The display could also summarize and indicate if the cargo was within a temperature range or out of range based on user specified parameters. Returning to the main display screen 54 of FIG. 13, the user interface 10 may further be programmed to logoff the advanced user when the soft key 36 is pressed. After the soft key 36 is pressed and the advanced user is logged off, the advanced user's session on the user interface 10 is terminated and the main display screen 54 may return to the normal display presented to normal users of the user interface 10.

The customized programming may be installed at the user interface 10 in a similar manner as discussed above for the security level designations during initial configuration, via subsequent downloads or use of the input devices of the user interface 10. For example, in one implementation, the user interface 10 may be configured to reprogram soft keys 30-36 in a similar manner as station buttons of a radio. After a user navigates through the menu structure to a particular screen, the user may press one of the soft keys 30-36 and hold for a predetermined period of time, such as a few seconds, after which the processor 42 will update the information associated with the authorization code so that the user interface 10 will display the same screen when the same soft key 30-36 is pressed at the main display screen 54. The user interface 10 may further be programmed to display an indication of the preprogrammed screen or function in the advanced communications strip 60 of the main display screen above the corresponding soft key 30-36, or on other screens where direct access to certain other functions or data by the technician or other user of the user interface 10 is desirable. The reprogrammable soft keys 30-36 provide the customer with the flexibility to provide each user of the user interface 10 with rapid access to the information and functions that are important to the performance of their job by minimizing the need to navigate multiple menu levels. Each authorization code or authorization level may have associated unique programming for the soft keys 30-36 to further increase the flexibility of the customer to facilitate the employees' ability to complete their tasks associated with the refrigeration unit 3.

Implementing the USB port 40 at the user interface 10 may provide additional advantages in configuring the user interface 10 and controlling and maintaining the transport refrigeration unit 3. It may not be necessary to store software at the user interface 10 that is not used during normal operation of the user interface 10 to control the operation of the unit 3, thereby conserving space in memories 44, 46 and even allowing for use of smaller, less expensive memory devices. For example, diagnostics routines used by technicians to diagnose and correct problems in the refrigeration unit 3 may not have to be stored in the user interface 10 or control module 4. Since the technician and the refrigeration unit 3 will be in the same location during servicing, the diagnostics routines may be stored on a USB flash drive or other external device in the possession of the technician. When the technician connects the device to USB port 40 or other port, the diagnostics routine(s) may be executed by user interface 10 and provide step-by-step instructions to the technician for diagnosing the problem with the refrigeration unit 3 on the display screen 14 of the user interface. Those skilled in the art will understand that other software applications that may not be necessary to the normal operations of the refrigeration unit 3 may be stored on external devices, and that the external devices may be connected to the user interface 10 at the appropriate time for execution of the software.

The programmable user interface 10 in accordance with the present disclosure provides many enhanced features over user interfaces presently known in the transport refrigeration industry. The trip graph allows the performance of the refrigeration unit 3 to be evaluated at the device without the necessity of transferring the trip information to a separate device for display of the trip information. Designated user levels both control the access to information and functions provided by the system by the various classes of users of the system, and reduces the amount of information and functionality presented to a user to only that which is necessary for the performance of their job. Integration of the USB port facilitates the exchange of information between the refrigeration unit 3 and the external systems of the enterprise so that the performance of the unit 3 may be monitored, maintained, upgraded and integrated into the information systems of the enterprise. Moreover, the ability to program the soft keys to provide custom menu structures and other functionality allows flexibility for an organization to customize the refrigeration unit and user interface to meet the needs of the organization without the expense of developing custom control systems.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A graphical user interface device for controlling and monitoring the operation of a transport refrigeration unit, comprising:
   a display device;
   a plurality of input devices;
   a data storage device;

an input port for operatively connecting an external device to the graphical user interface device; and a processor operatively connected to the display device, the plurality of input devices, the memory device and the input port, the processor being programmed to store a menu structure in the data storage device of the graphical user interface device, wherein the menu structure includes multiple levels of menu options, the menu options being associated with controlling and monitoring the operation of the transport refrigeration unit, and wherein each menu option has an option security level designation stored therewith, the processor being programmed to cause the display device to display a first subset of the menu options when no authorization code is input by a user at the graphical user interface device, wherein the menu options in the first subset have option security level designations equal to a first security level designation, and the processor being programmed to cause the display device to display a second subset of the menu options in response to entry of an authorization code by a user at the graphical user interface device, the second subset of menu options being customizable and displayed on the display device based on a preference of the user entering the authorization code, wherein the menu options in the second subset include the menu options in the first subset and menu options having option security level designations equal to a second security level designation.

2. A graphical user interface device for a transport refrigeration unit according to claim 1, wherein the processor is programmed to detect input of an authorization code by a user at the graphical user interface device by actuating input devices of the graphical user interface device in a predetermined sequence.

3. A graphical user interface device for a transport refrigeration unit according to claim 1, wherein an authorization code is stored on an external device configured for attachment to the input port of the graphical user interface device, and wherein the processor is programmed to detect connection of the external device to the input port, to receive the authorization code from the external device, and to compare the transferred authorization code to the at least one authorization code stored in the data storage device.

4. A graphical user interface device for a transport refrigeration unit according to claim 3, wherein the input port is a usb port and the external device is a USB flash drive.

5. A graphical user interface device for a transport refrigeration unit according to claim 1, wherein the menu structure includes a lower level menu option having at least one menu option between a top level menu option and the lower level menu option, where in the processor is programmed to require a user to actuate input devices to select each of the menu options between the top level menu option and the lower level menu option to display the lower level menu option at the display device when no authorization code is input by a user at the graphical user interface device, and wherein the processor is programmed to display the lower level menu option at the display device without requiring a user to actuate input devices to select each of the menu options between the top level menu option and the lower level menu option in response to detecting actuation of a preprogrammed one of the input devices of the graphical user interface device after the authorization code matching the authorization code stored in the data storage device is input by the user at the graphical user interface device.

6. A graphical user interface device for a transport refrigeration unit according to claim 1, wherein the processor is programmed to store a plurality of data items associated with a first menu option in the data storage device, wherein each data item has a data item security level designation stored therewith, and wherein the processor is programmed to cause the display device to display a first subset of the data items of the first menu option having menu security level designations equal to the first security level designation at the display device when the first menu option is selected and no authorization code is input by a user at the graphical user interface device, and wherein the processor is programmed to cause the display device to display a second subset of the data items of the first menu option at the display device after the authorization code matching the authorization code stored in the data storage device is input by the user at the graphical user interface device, wherein the data items in the second subset of the data items include the data items in the first subset of the data items and data items having data item security level designations equal to the second security level designation.

7. A graphical user interface device for a transport refrigeration unit according to claim 1, wherein the processor is programmed to store at least one authorization code in the data storage device, wherein each authorization code has a code security level designation stored therewith, and wherein the processor is programmed to cause the display device to display the second set of menu options after an authorization code matching an authorization code stored in the data storage device is input by a user.

8. A graphical user interface device for a transport refrigeration unit according to claim 1, wherein the processor is programmed to generate a trip graph based on performance data for the transport refrigeration unit collected over a period of time, and to cause the display device to display the trip graph at the display device.

9. A graphical user interface device for a transport refrigeration unit according to claim 1, wherein the processor is programmed to read a diagnostic routine stored on an external device operatively connected at the input port, and to execute the diagnostic routine to diagnose problems with the operation of the transport refrigeration unit.

10. A method for providing access for display of a menu structure of a graphical user interface device for a transport refrigeration unit, comprising:

storing the menu structure in a data storage device of the graphical user interface device, wherein the menu structure includes multiple levels of menu options, the menu options being associated with controlling and monitoring operation of the transport refrigeration unit, and wherein each menu option has an option security level designation stored therewith;

displaying a first subset of the menu options at a display device of the graphical user interface device when no authorization code is input by a user at the graphical user interface device, wherein the menu options in the first subset have security level designations equal to a first security level designation; and displaying a second subset of the menu options at the display device of the graphical user interface device in response to entry of an authorization code by a user at the graphical user interface device, the second subset of menu options being customizable and displayed on the display device based on a preference of the user entering the authorization code, wherein the menu options in the second subset include the menu options in the first subset and menu options having menu security level designations equal to a second security level designation.

11. A method for providing access for display of a menu structure of a graphical user interface device for a transport refrigeration unit according to claim 10, wherein an authorization code is input by a user at the graphical user interface device by actuating a plurality of input devices of the graphical user interface device in a predetermined sequence.

12. A method for providing access for display of a menu structure of a graphical user interface device for a transport refrigeration unit according to claim 10, wherein an authorization code is input by a user at the graphical user interface device by connecting an external device storing the authorization code to the graphical user interface device and transferring the authorization code from the external device to the graphical user interface device.

13. A method for providing access for display of a menu structure of a graphical user interface device for a transport refrigeration unit according to claim 12, wherein the external device is a USB flash drive.

14. A method for providing access for display of a menu structure of a graphical user interface device for a transport refrigeration unit according to claim 10, wherein a lower level menu option requires selection of multiple menu options using input devices of the graphical user interface device before the lower level menu option is displayed at the display device, wherein the method comprises:
  requiring a user to select multiple menu options to display the lower level menu option at the display device when no authorization code is input by a user at the graphical user interface device; and
  displaying the lower level menu option at the display device without requiring a user to select multiple menu options in response to detecting actuation of a preprogrammed one of the input devices of the graphical user interface device after the authorization code matching the authorization code stored in the data storage device is input by the user at the graphical user interface device.

15. A method for providing access for display of a menu structure of a graphical user interface device for a transport refrigeration unit according to claim 10, comprising:
  storing a plurality of data items associated with a first menu option in the data storage device of the graphical user interface device, wherein each data item has a data item security level designation stored therewith;
  displaying a first subset of the data items of the first menu option at a display device of the graphical user interface device when the first menu option is selected and no authorization code is input by a user at the graphical user interface device, wherein the data items in the first subset of the data items have security level designations equal to the first security level designation;
  displaying a second subset of the data items of the first menu option at the display device of the graphical user interface device after the authorization code matching the authorization code stored in the data storage device is input by the user at the graphical user interface device, wherein the data items in the second subset of the data items include the data items in the first subset of the data items and data items having data item security level designations equal to the second security level designation.

16. A method for providing access for display of a menu structure of a graphical user interface device for a transport refrigeration unit according to claim 10, comprising:
  connecting an external device having a transport refrigeration unit diagnostics program stored thereon to the graphical user interface device at an input port;
  executing the transport refrigeration unit diagnostics program and displaying a diagnostics program display at the display device of the graphical user interface device; and
  performing a diagnostics routine of the transport refrigeration unit diagnostics program on the transport refrigeration unit in response to inputs by a user at input devices of the graphical user interface device.

17. A method for providing access for display of a menu structure of a graphical user interface device for a transport refrigeration unit according to claim 10, comprising:
  storing at least one authorization code in the data storage device, wherein each authorization code has a code security level designation stored therewith;
  displaying the second subset of the menu options at the display device of the graphical user interface device after an authorization code matching an authorization code stored in the data storage device is input by a user at the graphical user interface device.

18. An apparatus for regulating the temperature of an insulated trailer for transporting perishable goods, comprising:
  a transport refrigeration unit capable of producing warm or cold air and directing the warm or cold air into a cargo space of the insulated trailer; and
  a graphical user interface device operatively connected to the transport refrigeration unit to display information regarding the operation of the transport refrigeration unit and allow users to make input selections for controlling the operation of the transport refrigeration unit, the graphical user interface device comprising:
  a display device,
  a plurality of input devices,
  a memory device,
  an input port for operatively connecting an external device to the graphical user interface device, and
  a processor operatively connected to the display device, the plurality of input devices, the memory device and the input port,
  the processor being programmed to store a menu structure in the data storage device of the graphical user interface device, wherein the menu structure includes multiple levels of menu options, the menu options being associated with controlling and monitoring the operation of the transport refrigeration unit, and wherein each menu option has an option security level designation stored therewith,
  the processor being programmed to cause the display device to display a first subset of the menu options when no authorization code is input by a user at the graphical user interface device, wherein the menu options in the first subset have security level designations equal to a first security level designation, and
  the processor being programmed to cause the display device to display a second subset of the menu options in response to entry of an authorization code by a user at the graphical user interface device, the second subset of menu options being customizable and displayed on the display device based on a preference of the user entering the authorization code, wherein the menu options in the second subset include the menu options in the first subset and menu options having menu security level designations equal to a second security level designation.

19. An apparatus for regulating the temperature of an insulated trailer according to claim 18, wherein the processor is programmed to detect input of an authorization code by a user at the graphical user interface device by actuating input devices of the graphical user interface device in a predetermined sequence.

20. An apparatus for regulating the temperature of an insulated trailer according to claim 18, wherein an authorization code is stored on an external device configured for attachment to the input port of the graphical user interface device, and wherein the processor is programmed to detect connection of the external device to the input port, to receive the authorization code from the external device, and to compare the transferred authorization code to the at least one authorization code stored in the data storage device.

21. An apparatus for regulating the temperature of an insulated trailer according to claim 20, wherein the input port is a usb port and the external device is a USB flash drive.

22. An apparatus for regulating the temperature of an insulated trailer according to claim 20, wherein the menu structure includes a lower level menu option having at least one menu option between a top level menu option and the lower level menu option, where in the processor is programmed to require a user to actuate input devices to select each of the menu options between the top level menu option and the lower level menu option to display the lower level menu option at the display device when no authorization code is input by a user at the graphical user interface device, and wherein the processor is programmed to display the lower level menu option at the display device without requiring a user to actuate input devices to select each of the menu options between the top level menu option and the lower level menu option in response to detecting actuation of a preprogrammed one of the input devices of the graphical user interface device after the authorization code matching the authorization code stored in the data storage device is input by the user at the graphical user interface device.

23. An apparatus for regulating the temperature of an insulated trailer according to claim 20, wherein the processor is programmed to store a plurality of data items associated with a first menu option in the data storage device, wherein each data item has a data item security level designation stored therewith, and wherein the processor is programmed to cause the display device to display a first subset of the data items of the first menu option having menu security level designations equal to the first security level designation at the display device when the first menu option is selected and no authorization code is input by a user at the graphical user interface device, and wherein the processor is programmed to cause the display device to display a second subset of the data items of the first menu option at the display device after the authorization code matching the authorization code stored in the data storage device is input by the user at the graphical user interface device, wherein the data items in the second subset of the data items include the data items in the first subset of the data items and data items having data item security level designations equal to the second security level designation.

24. An apparatus for regulating the temperature of an insulated trailer according to claim 20, comprising an external device having a transport refrigeration unit diagnostics program stored thereon, wherein the external device is operatively connected to the graphical user interface device at the input port, wherein the processor is programmed to execute the transport refrigeration unit diagnostics program and to display a diagnostics program display at the display device, and wherein the processor is programmed to perform a diagnostics routine of the transport refrigeration unit diagnostics program on the transport refrigeration unit in response to inputs by a user at the input devices of the graphical user interface device.

25. An apparatus for regulating the temperature of an insulated trailer according to claim 18, wherein the processor is programmed to store at least one authorization code in the data storage device, wherein each authorization code has a code security level designation stored therewith, and wherein the processor is programmed to cause the display device to display the second set of menu options after an authorization code matching an authorization code stored in the data storage device is input by a user.

26. An apparatus for regulating the temperature of an insulated trailer according to claim 18, wherein the processor is programmed to generate a trip graph based on performance data for the transport refrigeration unit collected over a period of time, and to cause the display device to display the trip graph at the display device.

27. An apparatus for regulating the temperature of an insulated trailer according to claim 18, wherein the processor is programmed to read a diagnostic routine stored on an external device operatively connected at the input port, and to execute the diagnostic routine to diagnose problems with the operation of the transport refrigeration unit.

\* \* \* \* \*